United States Patent
Zhong

(10) Patent No.: US 12,217,717 B2
(45) Date of Patent: Feb. 4, 2025

(54) CIRCUIT AND METHOD FOR CONDITIONING CLOCK SIGNAL, DISPLAY PANEL, AND DISPLAY DEVICE

(71) Applicant: TCL CHINA STAR OPTOELECTRONICS TECHNOLOGY CO., LTD., Guangdong (CN)

(72) Inventor: Zhaoxian Zhong, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/756,663

(22) PCT Filed: Apr. 19, 2022

(86) PCT No.: PCT/CN2022/087609
§ 371 (c)(1),
(2) Date: May 30, 2022

(87) PCT Pub. No.: WO2023/178775
PCT Pub. Date: Sep. 28, 2023

(65) Prior Publication Data
US 2024/0161711 A1    May 16, 2024

(30) Foreign Application Priority Data
Mar. 24, 2022    (CN) .......................... 202210303037.6

(51) Int. Cl.
G09G 3/36        (2006.01)
G09G 3/3266     (2016.01)

(52) U.S. Cl.
CPC ......... G09G 3/3677 (2013.01); G09G 3/3266 (2013.01); *G09G 2310/08* (2013.01)

(58) Field of Classification Search
CPC ...... G09G 3/3266; G09G 3/36; G09G 3/3674; G09G 3/3677; G09G 2310/08
(Continued)

(56) References Cited

U.S. PATENT DOCUMENTS

2006/0119396 A1    6/2006   Lin
2013/0222357 A1*  8/2013   Tseng ....................... G09G 3/20
                                                                           345/212
2021/0174718 A1    6/2021   Li

FOREIGN PATENT DOCUMENTS

CN    105118463 A    12/2015
CN    107331348 A    11/2017
(Continued)

OTHER PUBLICATIONS

Microelectronic Technology Issue 1 20000225 Inflection of Clock Skew and Its Elimination Technology Onmultistage Yu, Zongguang etc.

(Continued)

*Primary Examiner* — Mark Edwards
(74) *Attorney, Agent, or Firm* — PV IP PC; Wei Te Chung

(57) ABSTRACT

The present disclosure relates to a circuit and a method for conditioning a clock signal, display panel, and display device. The circuit includes a signal conversion circuit and a delay processing circuit; when a voltage amplitude of the converted electrical signal falls within a turn-on threshold range, the delay processing circuit receives the N-th clock signal transmitted from the N-th clock signal output terminal, and performs delay processing on the N-th clock signal, so as to avoid occurrence of GOA-stage transfer abnormality when one of the plurality of CK clock signals is in an abnormal condition that no signal is output.

15 Claims, 2 Drawing Sheets

(58) Field of Classification Search
USPC .......................................................... 345/99
See application file for complete search history.

(56) References Cited

FOREIGN PATENT DOCUMENTS

| | | | |
|---|---|---|---|
| CN | 107799043 | A | 3/2018 |
| CN | 109064982 | A | 12/2018 |
| CN | 110718197 | A | 1/2020 |
| JP | 2007087338 | A | 4/2007 |
| KR | 20050054464 | A | 6/2005 |
| WO | 2018209743 | A1 | 11/2018 |

OTHER PUBLICATIONS

International Search Report in International application No. PCT/CN2022/087609, mailed on Dec. 15, 2022.
Written Opinion of the International Search Authority in International application No. PCT/CN2022/087609, mailed on Dec. 15, 2022.
Chinese Office Action issued in corresponding Chinese Patent Application No. 202210303037.6 dated Nov. 29, 2022, pp. 1-6.

\* cited by examiner

CIRCUIT AND METHOD FOR CONDITIONING CLOCK SIGNAL, DISPLAY PANEL, AND DISPLAY DEVICE

RELATED APPLICATIONS

This application is a National Phase of PCT Patent Application No. PCT/CN2022/087609 having international filing date of Apr. 19, 2022, which claims the benefit of priority of Chinese Patent Application No. 202210303037.6 filed on Mar. 24, 2022. The contents of the above applications are all incorporated by reference as if fully set forth herein in their entirety.

TECHNICAL FIELD

The present disclosure relates to a display processing technical field, and in particular, to a circuit and a method for conditioning a clock signal, display panel, and display device.

BACKGROUND

Liquid crystal display panels are widely used in various consumer electronic products such as mobile phones, televisions, personal digital assistants, digital cameras, notebook computers, and desktop computers because of their advantages such as high image quality, power saving, thin body, and wide application range. Thus, the Liquid crystal display panels become the mainstream in display panels.

At present, driving horizontal scan lines in an active liquid crystal display panel is mainly carried out by an external IC (integrated circuit). The external IC can control the line-by-line charging and discharging of respective lines of the horizontal scan lines. However, in the GOA (Gate On Array) technique, a Gate line scan drive signal circuit is disposed on a array substrate by a TFT (Thin Film Transistor) liquid crystal display array process, thereby realizing a drive method for scanning the Gate line-by-line. Therefore, it is possible to use the existing process of the liquid crystal display panel to form the horizontal scan line drive circuit on the substrate around the display region. By the GOA technology, the bonding process of the external IC can be reduced, the yield is increased and the product cost is reduced. Thus, the liquid crystal display panel is more suitable for manufacturing the display product with a narrow bezel or without a bezel.

Technical Problems

In the current liquid crystal panel display technology, the GOA stage shift is used as the line scanning drive. When a plurality of CK clock signals are set as the signal for enabling the line scanning, if one of the plurality of CK clock signals is in a condition that no signal is output, that is, the output is abnormal, the GOA stage transfer is abnormal, and the display abnormal problem occurs.

Technical Solutions

Based on this, it is necessary to provide a circuit and a method for conditioning clock signal, a display panel, and a display device in view of the above technical problems.

A clock signal conditioning circuit includes:
a signal conversion circuit, wherein an input terminal of the signal conversion circuit is configured to be connected to a (N+1)-th clock signal output terminal, an output terminal of the signal conversion circuit is configured to output a converted electrical signal, and the (N+1)-th clock signal output terminal is configured to be connected to the (N+1)-th stage GOA drive circuit; and a delay processing circuit configured to receive the converted electrical signal transmitted from the signal conversion circuit; wherein the delay processing circuit is further configured to receive an N-th clock signal transmitted from the N-th clock signal output terminal when a voltage amplitude of the converted electrical signal falls within a turn-on threshold range, perform delay processing on the N-th clock signal based on a preset interval clock signal to obtain a delayed clock signal, and transmit the delayed clock signal to the (N+1)-th stage GOA drive circuit; and a timing of the delayed clock signal is the same as a timing of the (N+1)-th clock signal output from the (N+1)-th clock signal output terminal.

A clock signal conditioning method includes the steps of:
receiving a converted electrical signal transmitted from a signal conversion circuit;
when a voltage amplitude of the converted electrical signal falls within a turn-on threshold range, receiving an N-th clock signal transmitted from an N-th clock signal output terminal, and performing delay processing on the N-th clock signal based on a preset interval clock signal to obtain a delayed clock signal; and transmitting the delayed clock signal to the (N+1)-th stage GOA drive circuit, wherein the timing of the delayed clock signal is the same as that of the (N+1)-th clock signal output from the (N+1)-th clock signal output terminal.

In an embodiment, a duty ratio of the preset interval clock signal is obtained according to a duty ratio of the N-th clock signal and a duty ratio of the (N+1)-th clock signal.

A display panel includes a pixel unit, a GOA circuit, and a clock signal conditioning circuit; wherein the clock signal conditioning circuit is connected to the GOA circuit, and the GOA circuit is connected to the pixel unit;
wherein the clock signal conditioning circuit includes:
a signal conversion circuit, wherein an input terminal of the signal conversion circuit is configured to be connected to a (N+1)-th clock signal output terminal, an output terminal of the signal conversion circuit is configured to output a converted electrical signal; and a (N+1)-th clock signal output terminal is configured to be connected to the (N+1)-th stage GOA drive circuit; and a delay processing circuit configured to receive the converted electrical signal transmitted from the signal conversion circuit; wherein the delay processing circuit is further configured to receive an N-th clock signal transmitted from the N-th clock signal output terminal when the voltage amplitude of the converted electrical signal falls within a turn-on threshold range, perform delay processing on the N-th clock signal based on a preset interval clock signal, obtain a delayed clock signal, and transmit the delayed clock signal to the (N+1)-th stage GOA drive circuit; and the timing of the delayed clock signal is the same as the timing of the (N+1)-th clock signal output from the (N+1)-th clock signal output terminal.

A display device includes a display panel;
wherein the display panel includes a pixel unit, a GOA circuit, and a clock signal conditioning circuit; wherein the clock signal conditioning circuit is connected to the GOA circuit, and the GOA circuit is connected to the pixel unit;

wherein the clock signal conditioning circuit includes:

a signal conversion circuit, wherein an input terminal of the signal conversion circuit is configured to be connected to a (N+1)-th clock signal output terminal, an output terminal of the signal conversion circuit is configured to output a converted electrical signal; and a (N+1)-th clock signal output terminal is configured to be connected to the (N+1)-th stage GOA drive circuit; and a delay processing circuit configured to receive the converted electrical signal transmitted from the signal conversion circuit; wherein the delay processing circuit is further configured to receive an N-th clock signal transmitted from the N-th clock signal output terminal when the voltage amplitude of the converted electrical signal falls within a turn-on threshold range, perform delay processing on the N-th clock signal based on a preset interval clock signal, obtain a delayed clock signal, and transmit the delayed clock signal to the (N+1)-th stage GOA drive circuit; and the timing of the delayed clock signal is the same as the timing of the (N+1)-th clock signal output from the (N+1)-th clock signal output terminal.

Beneficial Effects

In the above-described clock signal conditioning circuit, the input terminal of the signal conversion circuit is configured to be connected to the (N+1)-th clock signal output terminal, and the output terminal of the signal conversion circuit is configured to output the converted electric signal. The (N+1)-th clock signal output terminal is configured to be connected to the (N+1)-th stage GOA drive circuit. The delay processing circuit is configured to receive the converted electrical signal transmitted from the signal conversion circuit. The delay processing circuit is further configured to receive the N-th clock signal transmitted from the N-th clock signal output terminal when the voltage amplitude of the converted electrical signal falls within the turn-on threshold range; perform delay processing on the N-th clock signal based on the preset interval clock signal, to obtain the delayed clock signal; and transmit the delayed clock signal to the (N+1)-th stage GOA drive circuit. The timing of the delayed clock signal is the same as the timing of the (N+1)-th clock signal output from the (N+1)-th clock signal output terminal. The stage transfer of the GOA circuit is not abnormal due to no signal output from the (N+1)-th stage GOA drive circuit, thereby enhancing display stability. In the present disclosure, the voltage amplitude of the converted electrical signal transmitted from the signal conversion circuit is detected by the delay processing circuit; when the voltage amplitude of the converted electrical signal reaches the turn-on threshold, it is determined that the (N+1)-th clock signal output terminal is abnormal, that is, no signal is output from the (N+1)-th clock signal output terminal; and the delay processing is controlled to be performed on the N-th clock signal output by the N-th clock signal output terminal to output the delayed clock signal, which is connected to the (N+1)-th stage GOA drive circuit, having the same timing as the (N+1)-th clock signal normally output, thereby avoiding the problem that when one of the plurality of CK clock signals is in an abnormal condition that no signal is output, an abnormality occurs in the GOA stage transfer, and the display abnormal problem occurs. Therefore, the display stability is enhanced, and the product quality is improved.

BRIEF DESCRIPTION OF THE DRAWINGS

In order to more clearly describe the technical solutions in embodiments of the present disclosure or the prior art, the accompanying drawings required in the description of the embodiments or the prior art will be briefly described below. Apparently, the accompanying drawings in the following description are merely some embodiments of the present disclosure. Other drawings may be obtained by a person of ordinary skill in the art without creative efforts.

REFERENCE NUMBER DESCRIPTION

10. clock signal conditioning circuit; 110. signal conversion circuit; 112. Schmitt trigger; 120. delay processing circuit; 122. switch circuit; 222. PMOS transistor; 124. delay circuit; 322. first D flip-flop; 324. second D flip-flop; 326. third D flip-flop; 328. fourth D flip-flop; 332. five D flip-flop; 334. first AND gate; 336. second AND gate; 338. third AND gate; 342. fourth AND gate.

EMBODIMENTS OF THE PRESENT DISCLOSURE

In order to make the objective, technical solutions and advantages of the present disclosure more clear, the present disclosure is further described in detail in combination with the following drawings and embodiments. It should be understood that the specific embodiments described herein are merely intended to explain the present disclosure and are not intended to limit the present disclosure.

Figure 1:
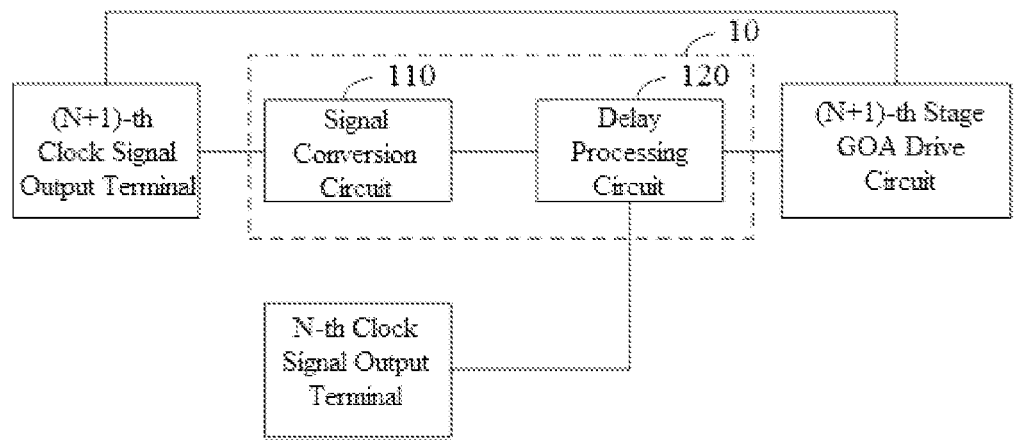
FIG. 1 is a first structural schematic view of a clock signal conditioning circuit according to an embodiment of the present disclosure.

In order to solve the problems that in the current liquid crystal panel display technology, when there is an abnormal condition of no signal in a CK clock signal, an abnormality occurs at a GOA cascade circuit, and then a display abnormality occurs. In one embodiment, as shown in FIG. 1, a clock signal conditioning circuit is provided. The clock signal conditioning circuit 10 includes a signal conversion circuit 110 and a delay processing circuit 120.

An input terminal of the signal conversion circuit 110 is configured to be connected to a (N+1)-th clock signal output terminal, and an output terminal of the signal conversion circuit 110 is configured to output the converted electric signal. A (N+1)-th clock signal output terminal is configured to be connected to the (N+1)-th stage GOA drive circuit. The delay processing circuit 120 is configured to receive a converted electrical signal transmitted from the signal conversion circuit 110. The delay processing circuit 120 is further configured to, when the voltage amplitude of the converted electrical signal falls within a turn-on threshold range, receive an N-th clock signal transmitted from the N-th clock signal output terminal, perform delay processing on the N-th clock signal based on a preset interval clock signal, and obtain a delayed clock signal. The delay processing circuit 120 is further configured to transmit the delayed clock signal to the (N+1)-th stage GOA drive circuit. The timing of the delayed clock signal is the same as that of the (N+1)-th clock signal output from the (N+1)-th clock signal output terminal.

The GOA circuit may include a plurality of GOA drive circuits. For example, the (N+1)-th stage GOA drive circuit may be configured to scan and drive a corresponding pixel unit when a clock signal for the pixel unit is input (or "received or connected"). For example, the (N+1)-th stage GOA drive circuit may be configured to normally scan and drive the pixel unit when the (N+1)-th clock signal or the delayed clock signal is input. It should be noted that N is a natural number.

The converted electrical signal may be a level signal, and the signal conversion circuit 110 may be configured to convert the input clock signal into a level signal. For example, when the (N+1)-th clock signal is output from the (N+1)-th clock signal output terminal, and the signal conversion circuit 110 receives the (N+1)-th clock signal, the signal conversion circuit 110 outputs a high level signal. When no signal is output from the (N+1)-th clock signal output terminal, the signal conversion circuit 110 outputs a low level signal. The delay processing circuit 120 may be configured to receive the converted electrical signal transmitted from the signal conversion circuit 110, and to perform a determine process for the received converted electrical signal. For example, the delay processing circuit 120 may compare the converted electrical signal with a preset turn-on threshold range, and if the voltage amplitude of the converted electrical signal is not in the turn-on threshold range, it is determined that the converted signal received by the delay processing circuit 120 is a high level signal. Then, the signal transmission channel between the N-th clock signal output terminal and the delay processing circuit 120 is disconnected. No output signal is output from the delay processing circuit 120, and the (N+1)-th clock signal output terminal normally transmits the (N+1)-th clock signal to the (N+1)-th stage GOA drive circuit.

The delay processing circuit 120 compares the converted electrical signal with the preset turn-on threshold range, and if the voltage amplitude of the converted electrical signal falls within the turn-on threshold range, it is determined that the converted electrical signal received by the delay processing circuit 120 is a low level signal; conducts the signal transmission channel between the N-th clock signal output terminal and the delay processing circuit 120 so that the N-th clock signal is received by the delay processing circuit 120; performs delay processing on the N-th clock signal based on the preset interval clock signal, so that the timing of the delayed clock signal after the delay processing is the same as the timing of the (N+1)-th clock signal output from the (N+1)-th clock signal output terminal, and transmits the delayed clock signal to the (N+1)-th stage GOA drive circuit. Thus the (N+1)-th stage GOA drive circuit operates normally, thereby avoiding a problem that when one of the plurality of CK clock signals is in a condition that no signal is output, the GOA stage transfer is abnormal, and the display abnormal problem occurs.

In the above-described embodiment, the input terminal of the signal conversion circuit 110 is configured to be connected to the (N+1)-th clock signal output terminal, and the output terminal of the signal conversion circuit 110 is configured to output the converted electric signal. A (N+1)-th clock signal output terminal is configured to be connected to the (N+1)-th stage GOA drive circuit. The delay processing circuit 120 is configured to receive the converted electrical signal transmitted from the signal conversion circuit 110. The delay processing circuit 120 is further configured to, when the voltage amplitude of the converted electrical signal falls within the turn-on threshold range, receive the N-th clock signal transmitted from the N-th clock signal output terminal, and perform the delay processing on the N-th clock signal based on the preset interval clock signal to obtain the delayed clock signal. The delay processing circuit 120 is further configured to transmit the delayed clock signal to the (N+1)-th stage GOA drive circuit. The timing of the delayed clock signal is the same as that of the (N+1)-th clock signal output from the (N+1)-th clock signal output terminal. Therefore, the stage shift (i.e., transmission in tandem or stage transfer) in the GOA circuit is not abnormal due no signal output from the (N+1)-th stage GOA drive circuit, thereby enhancing display stability. The voltage amplitude of the converted electrical signal transmitted from the signal conversion circuit 110 is detected by the delay processing circuit 120. When the voltage amplitude of the converted electrical signal falls within the turn-on threshold range, it is determined that the (N+1)-th clock signal output terminal outputs abnormally. That is, no signal is output from the (N+1)-th clock signal output terminal. To this end, the delay processing circuit 120 performs the delay processing on the N-th clock signal output from the N-th clock signal output terminal to output the delayed clock signal having the same timing as that of the normal (N+1)-th clock signal. The delayed clock signal is input to the (N+1)-th stage GOA drive circuit, so as to avoid and thereby prevent a problem that when one of the plurality of CK clock signals is in a condition that no signal is output, the GOA stage transfer is abnormal, and the display abnormal problem occurs. Therefore, the display stability is enhanced, and the product quality is improved.

Figure 2:
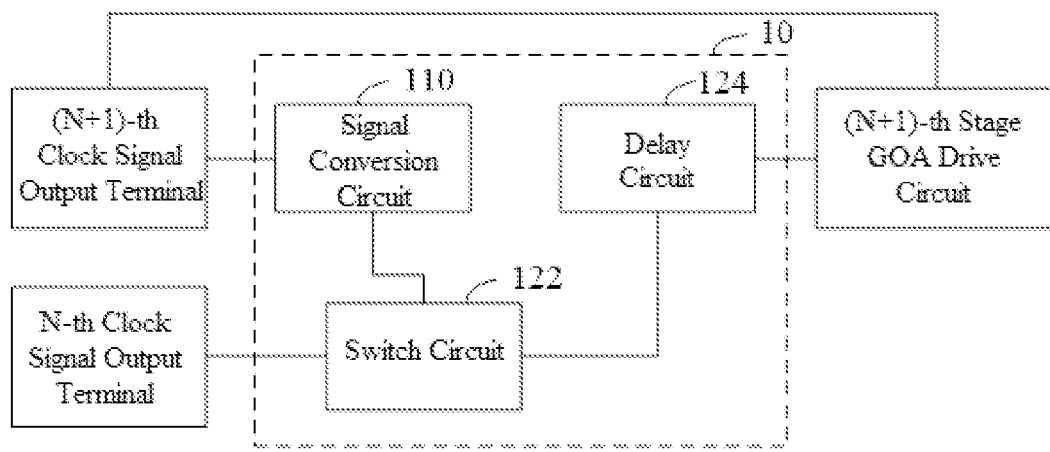
FIG. 2 is a second structural schematic view of a clock signal conditioning circuit according to an embodiment of the present disclosure.

In one example, as shown in FIG. 2, the delay processing circuit 120 includes a switch circuit 122 and a delay circuit 124.

A control terminal of the switch circuit 122 is configured to receive the converted electrical signal, and an input terminal of the switch circuit 122 is configured to be connected to the N-th clock signal output terminal. A first input terminal of the delay circuit 124 is connected to an output terminal of the switch circuit 122, and a second input terminal of the delay circuit 124 is configured to input and receive a preset interval clock signal. The output terminal of the delay circuit 124 is configured to be connected to the (N+1)-th stage GOA drive circuit. When no signal is output from the (N+1)-th clock signal output terminal, the voltage amplitude of the converted electrical signal falls within the turn-on threshold range (or on threshold range) of the switch circuit 122. In this case, the delay circuit 124 receives the N-th clock signal transmitted from the N-th clock signal output terminal, performs the delay processing on the N-th clock signal based on the interval clock signal to obtain the delayed clock signal, and transmits the delayed clock signal to the (N+1)-th stage GOA drive circuit.

The switch circuit 122 may control a signal channel from the input terminal to the output terminal of the switch circuit 122 to be connected or disconnected, according to the voltage magnitude of the received converted electrical signal. For example, when the voltage amplitude of the converted electrical signal received by the switch circuit 122 falls within the turn-on threshold range of the switch circuit 122, it is determined that no signal is output from the (N+1)-th clock signal output terminal. The signal channel between the input terminal and the output terminal of the switch circuit 122 is conducted. That is, the signal channel between the N-th clock signal output terminal and the delay circuit 124 is conducted. Then the N-th clock signal is transmitted from the N-th clock signal output terminal to the delay circuit 124 through the switch circuit 122. As such, the delay circuit 124 receives the N-th clock signal, performs delay processing on the N-th clock signal based on the interval clock signal to obtain the delayed clock signal, and transmits the delayed clock signal to the (N+1)-th stage GOA drive circuit. In this case, the (N+1)-th stage GOA drive circuit operates normally, thereby avoiding a problem that when one of the plurality of CK clock signals is in a condition that no signal is output, the GOA stage transfer is abnormal, and the display abnormal problem occurs.

When the voltage amplitude of the converted electrical signal received by the switch circuit 122 does not fall within the turn-on threshold range of the switch circuit 122, it is determined that the (N+1)-th clock signal is normally output from the (N+1)-th clock signal output terminal. The signal channel between the input terminal and the output terminal of the switch circuit 122 is disconnected. That is, the signal channel between the N-th clock signal output terminal and the delay circuit 124 is disconnected. No signal is output from the delay circuit 124. The (N+1)-th clock signal is normally transmitted from the (N+1)-th clock signal output terminal to the (N+1)-th stage GOA drive circuit.

In the above-described embodiment, the switch circuit 122 controls to connector disconnect the signal channel between the N-th clock signal output terminal and the delay circuit 124, according to the voltage amplitude of the converted electrical signal. When the voltage amplitude of the converted electrical signal falls within the turn-on threshold range, determine the output abnormality of the N-th clock signal output terminal. That is, no signal is output from the (N+1)-th clock signal output terminal. To this end, the N-th clock signal output from the N-th clock signal output terminal is delayed, such that the delayed clock signal has the same timing as that of the normal (N+1)-th clock signal, and is input to the (N+1)-th stage GOA drive circuit, thereby avoiding a problem that when one of the plurality of CK clock signals is in a condition that no signal is output, the GOA stage transfer is abnormal, and the display abnormal problem occurs. Therefore, the display stability is enhanced, and the product quality is improved.

Figure 3:
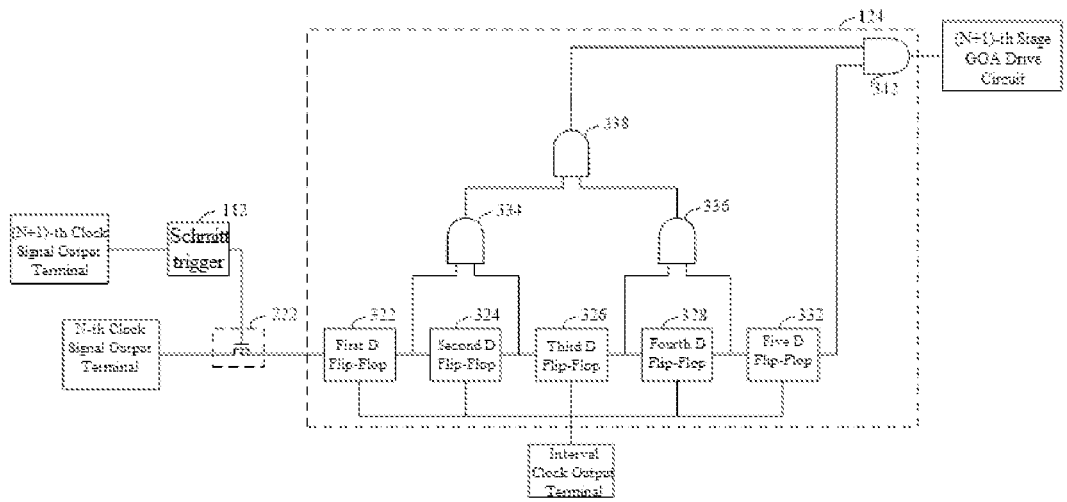
FIG. 3 is a third structural schematic view of a clock signal conditioning circuit according to an embodiment of the present disclosure.

In one example, as shown in FIG. 3, the signal conversion circuit 110 includes a Schmitt trigger 112. An input terminal of the Schmitt trigger 112 is connected to the (N+1)-th clock signal output terminal. An output terminal of the Schmitt trigger 112 is connected to the control terminal of the switch circuit 122.

The input terminal of the Schmitt trigger 112 is connected to the (N+1)-th clock signal output terminal. The output terminal of the Schmitt trigger 112 is connected to the control terminal of the switch circuit 122. Therefore, in the case that the (N+1)-th clock signal output terminal normally output a signal, the (N+1)-th clock signal (i.e., the CK (N+1) signal) is transmitted from the (N+1)-th clock signal output terminal to the Schmitt trigger 112, such that the Schmitt trigger 112 outputs a high level signal. For example, when the RMS value (effective voltage value) of the (N+1)-th clock signal transmitted from the (N+1)-th clock signal output terminal to the Schmitt trigger 112 is 5 V, a high level signal is transmitted from the Schmitt trigger 112 to the switch circuit 122, and thus the switch circuit 122 is not turned on. In the case of the output abnormality of the (N+1)-th clock signal, that is, no signal is output from the (N+1)-th clock signal output terminal, the Schmitt trigger 112 outputs a low level signal, and the switch circuit 122 is turned on.

In one example, as shown in FIG. 3, the switch circuit 122 includes a PMOS transistor 222. A gate of the PMOS transistor 222 is connected to the output terminal of the Schmitt trigger 112, a source of the PMOS transistor 222 is connected to the N-th clock signal output terminal, and a drain of the PMOS transistor 222 is connected to the first input terminal of the delay circuit 124.

Since the gate of the PMOS transistor 222 is connected to the output terminal of the Schmitt flip-flop 112, the source of the PMOS transistor 222 is connected to the N-th clock signal output terminal, and the drain of the PMOS transistor 222 is connected to the first input terminal of the delay circuit 124, when the gate of the PMOS transistor 222 receives the high level signal transmitted from the Schmitt flip-flop 112, the PMOS transistor 222 is turned off, that is, the signal channel between the N-th clock signal output terminal and the delay circuit 124 is disconnected. In this case, no signal is output from the delay circuit 124, and the (N+1)-th clock signal is normally transmitted from the (N+1)-th clock signal output terminal to the (N+1)-th stage GOA drive circuit.

When the gate of the PMOS transistor 222 receives the low level signal transmitted from the Schmitt trigger 112, it is determined that no signal is output from the (N+1)-th clock signal output terminal. The PMOS transistor 222 is turned on, that is, the signal channel between the (N+1)-th clock signal output terminal and the delay circuit 124 is conducted. In this case, the N-th clock signal is transmitted from the N-th clock signal output terminal to the delay circuit 124 through the switch circuit 122. Thus the delay circuit 124 receives the N-th clock signal, and performs the delay processing on the N-th clock signal based on the interval clock signal to obtain a delayed clock signal having the same timing as the (N+1)-th clock signal normally output. The delayed clock signal is transmitted to the (N+1)-th stage GOA drive circuit. Thus the (N+1)-th stage GOA drive circuit operates normally, thereby avoiding a problem that when one of the plurality of CK clock signals is in a condition that no signal is output, the GOA stage transfer is abnormal, and the display abnormal problem occurs.

In one example, as shown in FIG. 3, the delay circuit 124 includes a first D-flip-flop 322, a second D-flip-flop 324, a third D-flip-flop 326, a fourth D-flip-flop 328, a fifth D-flip-flop 332, a first AND gate 334, a second AND gate 336, a third AND gate 338, and a fourth AND gate 342.

An input terminal of the first D flip-flop 322 is connected to the drain of the PMOS transistor 222. An output terminal of the first D flip-flop 322 is connected to an input terminal of the second D flip-flop 324. An output terminal of the second D flip-flop 324 is connected to an input terminal of the third D flip-flop 326. An output terminal of the third D flip-flop 326 is connected to an input terminal of the fourth D flip-flop 328. An output terminal of the fourth D trigger 328 is connected to an input terminal of the fifth D-flip-flop 332. A clock terminal of the first D flip-flop 322, a clock terminal of the second D flip-flop 324, a clock terminal of the third D flip-flop 326, and a clock terminal of the fourth D flip-flop 328, a clock terminals of the fifth D flip-flop 332 are respectively configured to receive the interval clock signal.

A first input terminal of the first AND gate 334 is connected to the output terminal of the first D flip-flop 322. A second input terminal of the first AND gate 334 is connected to the output terminal of the second D flip-flop 324. An output terminal of the first AND gate 334 is connected to a first input terminal of the third AND gate 338. A first input terminal of the second AND gate 336 is connected to the output terminal of the third D flip-flop 326. A second input terminal of the second AND gate 336 is connected to the output terminal of the fourth D flip-flop 328. An output terminal of the second AND gate 336 is connected to a second input terminal of the third AND gate 338. A first input terminal of the fourth AND gate 342 is connected to an output terminal of the third AND gate 338. A second input terminal of the fourth AND gate 342 is connected to the output terminal of the fifth D flip-flop 332. An output terminal of the fourth AND gate 342 is connected to the (N+1)-th stage GOA drive circuit.

For example, the delay circuit 124 receives the N-th clock signal, and the N-th clock signal is logic processed by five D flip-flops and four AND gates. The delayed clock signal is obtained, which has the same timing as that of the normally output (N+1)-th clock signal. The delayed clock signal is transmitted to the (N+1)-th stage GOA drive circuit. Thus the (N+1)-th stage GOA drive circuit operates normally, thereby avoiding a problem that when one of the plurality of CK clock signals is in a condition that no signal is output, the GOA stage transfer is abnormal, and the display abnormal problem occurs. Therefore, the display stability is enhanced, and the product quality is improved.

It should be noted that the interval clock signal input to the delay circuit 124 may be determined according to the interval time between the specific N-th clock signal and the (N+1)-th clock signal.

In one example, the clock signal conditioning circuit 10 further includes a clock signal generator. The clock signal generator includes an interval clock output terminal and a plurality of clock signal output terminals. The interval clock output terminal is configured to output a preset interval clock signal.

The clock signal generator may be configured to output a plurality of clock signals. For example, an N-th clock signal output terminal of the clock signal generator may be configured to output the N-th clock signal. An (N+1)-th clock signal output terminal of the clock signal generator may be configured to output the (N+1)-th clock signal. The interval clock output terminal of the clock signal generator is configured to output a preset interval clock signal. It is should be noted that the duty ratio of the preset interval clock signal is obtained according to the duty ratio of the N-th clock signal and the duty ratio of the (N+1)-th clock signal.

Figure 4:
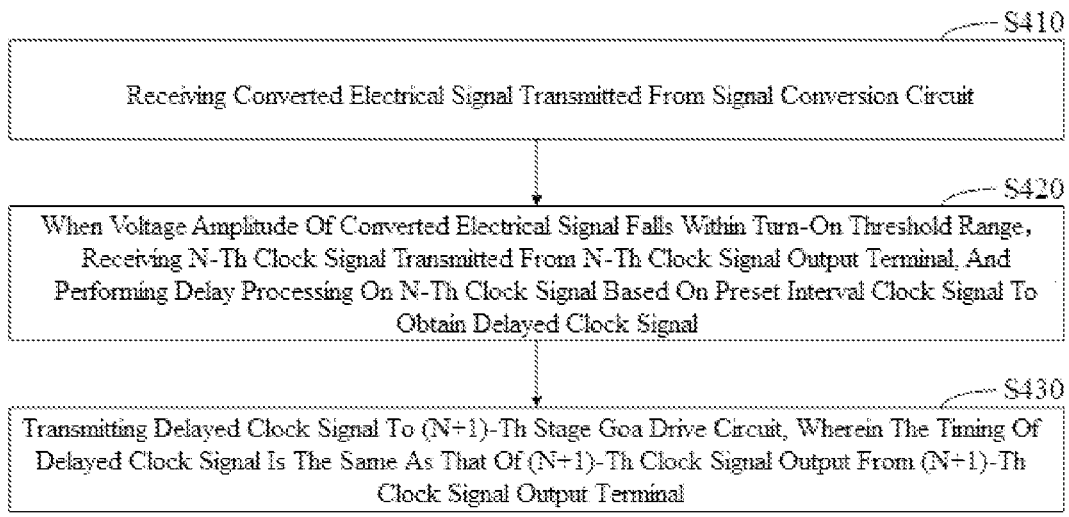
FIG. 4 is a flowchart of a clock signal conditioning method according to an embodiment of the present disclosure.

In one embodiment, as shown in FIG. 4, a clock signal conditioning method is provided. Take the delay processing circuit in FIG. 1 to which this method is applied as an example for description. This method includes the following steps:

Step S410: receiving the converted electric signal transmitted from the signal conversion circuit.

For a specific content process of the signal conversion circuit and the converted electrical signal, refer to the above content, and details are not described herein again.

For example, when the (N+1)-th clock signal is output from the (N+1)-th clock signal output terminal, the signal conversion circuit outputs a high level signal in accordance with the received (N+1)-th clock signal. When no signal is output from the (N+1)-th clock signal output terminal, the signal conversion circuit outputs a low level signal.

Step S420: receiving the N-th clock signal transmitted from the N-th clock signal output terminal, and performing the delay processing on the N-th clock signal based on the preset interval clock signal, to obtain a delayed clock signal, when the voltage amplitude of the converted electrical signal falls within the turn-on threshold range.

For example, the delay processing circuit may perform a determination process on the converted electrical signal transmitted from the signal conversion circuit. If the voltage amplitude of the converted electrical signal do not fall within the turn-on threshold range, it is determined that the converted signal received by the delay processing circuit is a high level signal, and thus the signal transmission channel between the N-th clock signal output terminal and the delay processing circuit is disconnected. No signal is output from the delay processing circuit. The (N+1)-th clock signal is normally transmitted from the (N+1)-th clock signal output terminal to the (N+1)-th stage GOA drive circuit.

If the voltage amplitude of the converted electrical signal falls within the turn-on threshold range, it is determined that the converted signal received by the delay processing circuit is a low level signal. The signal transmission channel between the N-th clock signal output terminal and the delay processing circuit is conducted. Thus, the delay processing circuit receives the N-th clock signal, and performs the delay processing on the N-th clock signal based on the preset interval clock signal. In this case, the timing of the delayed clock signal after the delay processing is the same as the timing of the (N+1)-th clock signal output by the (N+1)-th clock signal output terminal.

S430, transmitting the delayed clock signal to the (N+1)-th stage GOA drive circuit. The timing of the delayed clock signal is the same as that of the (N+1)-th clock signal output from the (N+1)-th clock signal output terminal.

The delay processing circuit may transmit the delayed clock signal obtained through the delay processing to the (N+1)-th stage GOA drive circuit. Thus the (N+1)-th stage GOA drive circuit operates normally, to avoid a problem that when one of the plurality of CK clock signals is in a condition that no signal is output, the GOA stage transfer is abnormal, and the display abnormal problem occurs.

It is should be noted that the duty ratio of the preset interval clock signal is obtained according to the duty ratio of the N-th clock signal and the duty ratio of the (N+1)-th clock signal.

In the above embodiment, the voltage amplitude of the converted electrical signal transmitted from the signal conversion circuit is detected by the delay processing circuit. When the voltage amplitude of the converted electrical signal falls within the turn-on threshold range, it is determined that the (N+1)-th clock signal output terminal is abnormal. That is, no signal is output from the (N+1)-th clock signal output terminal. To this end, the N-th clock signal output from the N-th clock signal output terminal is delayed, such that the delayed clock signal has the same timing as that of the normal (N+1)-th clock signal, and is input into the (N+1)-th stage GOA drive circuit, thereby avoiding a problem that when one of the plurality of CK clock signals is in a condition that no signal is output, the GOA stage transfer is abnormal, and the display abnormal problem occurs. Therefore, the display stability is enhanced, and the product quality is improved.

It should be understood that although steps in the flowchart in FIG. 4 are sequentially shown as indicated by arrows, these steps are not necessarily sequentially performed as indicated by arrows. Unless explicitly stated herein, the orders of these steps is not strictly limited, and these steps may be performed in other orders. Further, at least a part of the steps in FIG. 4 may include a plurality of sub-steps or stages, and the sub-steps or stages are not necessarily performed at the same time, but may be performed at different times. The order of the sub-steps or stages is not necessarily performed in order, but may be performed sequentially or alternately with other steps or at least a part of the sub-steps or stages of other steps.

In one embodiment, there is provided a display panel including a pixel unit, a GOA circuit, and any of the above clock signal conditioning circuits. The clock signal conditioning circuit is connected to the GOA circuit, and the GOA circuit is connected to the pixel unit.

For a specific process of the clock signal conditioning circuit, refer to the foregoing content, and details are not described herein The pixel unit is composed of a plurality of sub-pixels arranged in an array. Each sub-pixel is connected to a vertical data line and a horizontal scan line. The GOA circuit includes a plurality of GOA drive circuits in cascade. Each stage GOA drive circuit corresponds to one stage horizontal scan line. The main structure of the GOA drive circuit includes a pull-up circuit, a pull-up control circuit, a pull-down circuit, a pull-down sustain circuit, a bootstrap capacitor for bootstrapping the potential, and the like. The pull-up control circuit may also be referred to as a pre-charge circuit. The pull-up circuit is mainly configured for outputting the clock signal as a gate signal. The pull-up control circuit is configured for controlling the on-period of the pull-up circuit, and is generally connected with a stage shift signal or a gate signal transmitted from a previous stage GOA drive circuit. The pull-down circuit is configured for immediately pulling the gate signal low to a low potential, i.e., an off gate signal. The pull-down sustain circuit is configured for maintaining the gate output signal and the gate signal of the pull-up circuit (commonly referred to as a Q point) in an off state (i.e., the negative potential). The bootstrap capacitor is configured for secondary bootstrap the Q point, thus facilitating the G (N) output terminal of the pull-up circuit.

For example, the display panel is an AMOLED display panel, an AM Micro LED display panel, an AM Mini LED display panel, or an LCD display panel.

In the above-described embodiment, the clock signal conditioning circuit is connected to the GOA circuit and the GOA circuit is connected to the pixel unit. Therefore, the clock signal conditioning circuit can control to perform the delay processing on the N-th clock signal output from the N-th clock signal output terminal when no signal is output from the (N+1)-th clock signal output terminal, output the delayed clock signal having the timing same as that of the normal (N+1)-th clock signal after the delay processing, and is connected to the (N+1)-th stage GOA drive circuit, thereby avoiding a problem that when one of the plurality of CK clock signals is in a condition that no signal is output, the GOA stage transfer is abnormal, and the display abnormal problem occurs. Therefore, the display stability is enhanced, and the product quality is improved.

In one embodiment, a display device including a display panel as described above is provided.

For a specific process of the display panel and the clock signal conditioning circuit, refer to the above content, and details are not described herein again.

A person of ordinary skill in the art may understand that all or parts of the processes for implementing the methods of the above-described embodiments may be implemented by instructing relevant hardware by a computer program. The computer program may be stored in a non-volatile computer readable storage medium, and the computer program may, when executed, include the processes of the embodiments of the methods described above. Any reference to memory, storage, database, or other media in the embodiments provided herein may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, RAM is implemented in various forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink), DRAM (SLDRAM), memory bus (Rambus), direct RAM (RDRAM), direct memory bus dynamic RAM (DRDRAM), and memory bus dynamic RAM (RDRAM).

The technical features of the above embodiments may be arbitrarily combined. For the sake of brevity, all possible combinations of the technical features of the above embodiments are not described. However, as long as the combination of these technical features is not contradicted, it should be considered as the scope of the present specification.

The above-described examples represent only a few embodiments of the present disclosure, the description of which is more specific and detailed, but are not therefore to be construed as limiting the scope of present disclosure. It should be noted that, for those of ordinary skill in the art, several modifications and improvements may also be made without departing from the concept of the present disclosure. These fall within the scope of the present disclosure. Accordingly, the scope of the present disclosure shall be subject to the appended claims.

What is claimed is:

1. A clock signal conditioning circuit comprising:
a signal conversion circuit, wherein an input terminal of the signal conversion circuit is configured to be connected to a (N+1)-th clock signal output terminal, an output terminal of the signal conversion circuit is configured to output a converted electrical signal, and the (N+1)-th clock signal output terminal is configured to be connected to the (N+1)-th stage GOA drive circuit; and a delay processing circuit configured to receive the converted electrical signal transmitted from the signal conversion circuit; wherein the delay processing circuit is further configured to receive an N-th clock signal transmitted from the N-th clock signal output terminal when a voltage amplitude of the converted electrical signal falls within a turn-on threshold range, perform delay processing on the N-th clock signal based on a preset interval clock signal, to obtain a delayed clock signal, and transmit the delayed clock signal to the (N+1)-th stage GOA drive circuit; and a timing of the delayed clock signal is the same as a timing of the (N+1)-th clock signal output from the (N+1)-th clock signal output terminal,
wherein the delay processing circuit comprises:
a switch circuit, wherein a control terminal of the switch circuit is configured to receive the converted electrical signal, and an input terminal of the switch circuit is configured to be connected to the N-th clock signal output terminal; and
a delay circuit, wherein a first input terminal of the delay circuit is connected to the output terminal of the switch circuit, a second input terminal of the delay circuit is configured to receive a preset interval clock signal; the output terminal of the delay circuit is configured to be connected to the (N+1)-th stage GOA drive circuit, and wherein when no signal is output from the (N+1)-th clock signal output terminal, the voltage amplitude of the converted electrical signal falls within the turn-on threshold range of the switch circuit.

2. The clock signal conditioning circuit according to claim 1, wherein the signal conversion circuit comprises a Schmitt trigger; and
an input terminal of the Schmitt trigger is connected to the (N+1)-th clock signal output terminal, and an output terminal of the Schmitt trigger is connected to the control terminal of the switch circuit.

3. The clock signal conditioning circuit according to claim 2, wherein the switch circuit comprises a PMOS transistor; and
a gate of the PMOS transistor is connected to the output terminal of the Schmitt trigger, a source of the PMOS transistor is connected to the N-th clock signal output terminal, and a drain of the PMOS transistor is connected to the first input terminal of the delay circuit.

4. The clock signal conditioning circuit according to claim 3, wherein the delay circuit comprises a first D flip-flop, a second D flip-flop, a third D flip-flop, a fourth D flip-flop, a fifth D flip-flop, a first AND gate, a second AND gate, a third AND gate, and a fourth AND gate;
an input terminal of the first D flip-flop is connected to the drain of the PMOS transistor, an output terminal of the first D flip-flop is connected to an input terminal of the second D flip-flop, an output terminal of the second D flip-flop is connected to an input terminal of the third D flip-flop, an output terminal of the third D flip-flop is connected to an input terminal of the fourth D flip-flop, and an output terminal of the fourth D flip-flop is connected to an input terminal of the fifth D flip-flop;
a clock terminal of the first D flip-flop, a clock terminal of the second D flip-flop, a clock terminal of the third D flip-flop, a clock terminal of the fourth D flip-flop, and a clock terminal of the fifth D flip-flop are respectively configured to receive the interval clock signal; and
a first input terminal of the first AND gate is connected to the output terminal of the first D flip-flop, a second input terminal of the first AND gate is connected to the output terminal of the second D flip-flop, and an output terminal of the first AND gate is connected to a first input terminal of the third AND gate; a first input terminal of the second AND gate is connected to the output terminal of the third D flip-flop, a second input terminal of the second AND gate is connected to the output terminal of the fourth D flip-flop, and an output terminal of the second AND gate is connected to a second input terminal of the third AND gate; a first input terminal of the fourth AND gate is connected to an output terminal of the third AND gate, a second input terminal of the fourth AND gate is connected to an output terminal of the fifth D flip-flop, and an output terminal of the fourth AND gate is connected to the (N+1)-th stage GOA drive circuit.

5. The clock signal conditioning circuit according to claim 1, further comprising a clock signal generator; wherein the clock signal generator comprises an interval clock output terminal and a plurality of clock signal output terminals; and
the interval clock output terminal is configured to output the preset interval clock signal.

6. A display panel comprising a pixel unit, a GOA circuit, and a clock signal conditioning circuit; wherein the clock signal conditioning circuit is connected to the GOA circuit, and the GOA circuit is connected to the pixel unit; and wherein the clock signal conditioning circuit comprises:
a signal conversion circuit, wherein an input terminal of the signal conversion circuit is configured to be connected to a (N+1)-th clock signal output terminal, an output terminal of the signal conversion circuit is configured to output a converted electrical signal, and the (N+1)-th clock signal output terminal is configured to be connected to the (N+1)-th stage GOA drive circuit; and
a delay processing circuit configured to receive the converted electrical signal transmitted from the signal conversion circuit; wherein the delay processing circuit is further configured to receive an N-th clock signal transmitted from the N-th clock signal output terminal when a voltage amplitude of the converted electrical signal falls within a turn-on threshold range, perform delay processing on the N-th clock signal based on a preset interval clock signal, to obtain a delayed clock signal, and transmit the delayed clock signal to the (N+1)-th stage GOA drive circuit; and a timing of the delayed clock signal is the same as a timing of the (N+1)-th clock signal output from the (N+1)-th clock signal output terminal,
wherein the delay processing circuit comprises:
a switch circuit, wherein a control terminal of the switch circuit is configured to receive the converted electrical signal, and an input terminal of the switch circuit is configured to be connected to the N-th clock signal output terminal; and
a delay circuit, wherein a first input terminal of the delay circuit is connected to the output terminal of the switch circuit, a second input terminal of the delay circuit is configured to receive a preset interval clock signal; the output terminal of the delay circuit is configured to be connected to the (N+1)-th stage GOA drive circuit, and
wherein when no signal is output from the (N+1)-th clock signal output terminal, the voltage amplitude of the converted electrical signal falls within the turn-on threshold range of the switch circuit.

7. The display panel according to claim 6, wherein the signal conversion circuit comprises a Schmitt trigger; and
an input terminal of the Schmitt trigger is connected to the (N+1)-th clock signal output terminal, and an output terminal of the Schmitt trigger is connected to the control terminal of the switch circuit.

8. The display panel according to claim 7, wherein the switch circuit comprises a PMOS transistor; and
a gate of the PMOS transistor is connected to the output terminal of the Schmitt trigger, a source of the PMOS transistor is connected to the N-th clock signal output terminal, and a drain of the PMOS transistor is connected to the first input terminal of the delay circuit.

9. The display panel according to claim 8, wherein the delay circuit comprises a first D flip-flop, a second D flip-flop, a third D flip-flop, a fourth D flip-flop, a fifth D flip-flop, a first AND gate, a second AND gate, a third AND gate, and a fourth AND gate;
an input terminal of the first D flip-flop is connected to the drain of the PMOS transistor, an output terminal of the first D flip-flop is connected to an input terminal of the second D flip-flop, an output terminal of the second D flip-flop is connected to an input terminal of the third D flip-flop, an output terminal of the third D flip-flop is connected to an input terminal of the fourth D flip-flop, and an output terminal of the fourth D flip-flop is connected to an input terminal of the fifth D flip-flop;

a clock terminal of the first D flip-flop, a clock terminal of the second D flip-flop, a clock terminal of the third D flip-flop, a clock terminal of the fourth D flip-flop, and a clock terminal of the fifth D flip-flop are respectively configured to receive the interval clock signal; and a first input terminal of the first AND gate is connected to the output terminal of the first D flip-flop, a second input terminal of the first AND gate is connected to the output terminal of the second D flip-flop, and an output terminal of the first AND gate is connected to a first input terminal of the third AND gate; a first input terminal of the second AND gate is connected to the output terminal of the third D flip-flop, a second input terminal of the second AND gate is connected to the output terminal of the fourth D flip-flop, and an output terminal of the second AND gate is connected to a second input terminal of the third AND gate; a first input terminal of the fourth AND gate is connected to an output terminal of the third AND gate, a second input terminal of the fourth AND gate is connected to an output terminal of the fifth D flip-flop, and an output terminal of the fourth AND gate is connected to the (N+1)-th stage GOA drive circuit.

10. The display panel according to claim 6, further comprising a clock signal generator; wherein the clock signal generator comprises an interval clock output terminal and a plurality of clock signal output terminals; and the interval clock output terminal is configured to output the preset interval clock signal.

11. A display device comprising a display panel;

the display panel comprises a pixel unit, a GOA circuit, and a clock signal conditioning circuit; the clock signal conditioning circuit is connected to the GOA circuit, and the GOA circuit is connected to the pixel unit; and wherein the clock signal conditioning circuit comprises:

a signal conversion circuit, wherein an input terminal of the signal conversion circuit is configured to be connected to a (N+1)-th clock signal output terminal, an output terminal of the signal conversion circuit is configured to output a converted electrical signal, and the (N+1)-th clock signal output terminal is configured to be connected to the (N+1)-th stage GOA drive circuit; and a delay processing circuit configured to receive the converted electrical signal transmitted from the signal conversion circuit; wherein the delay processing circuit is further configured to receive an N-th clock signal transmitted from the N-th clock signal output terminal when a voltage amplitude of the converted electrical signal falls within a turn-on threshold range, perform delay processing on the N-th clock signal based on a preset interval clock signal, to obtain a delayed clock signal, and transmit the delayed clock signal to the (N+1)-th stage GOA drive circuit; and a timing of the delayed clock signal is the same as a timing of the (N+1)-th clock signal output from the (N+1)-th clock signal output terminal, wherein the delay processing circuit comprises:

a switch circuit, wherein a control terminal of the switch circuit is configured to receive the converted electrical signal, and an input terminal of the switch circuit is configured to be connected to the N-th clock signal output terminal; and a delay circuit, wherein a first input terminal of the delay circuit is connected to the output terminal of the switch circuit, a second input terminal of the delay circuit is configured to receive a preset interval clock signal; the output terminal of the delay circuit is configured to be connected to the (N+1)-th stage GOA drive circuit, and wherein when no signal is output from the (N+1)-th clock signal output terminal, the voltage amplitude of the converted electrical signal falls within the turn-on threshold range of the switch circuit.

12. The display device according to claim 11, wherein the signal conversion circuit comprises a Schmitt trigger; and an input terminal of the Schmitt trigger is connected to the (N+1)-th clock signal output terminal, and an output terminal of the Schmitt trigger is connected to the control terminal of the switch circuit.

13. The display device according to claim 12, wherein the switch circuit comprises a PMOS transistor; and a gate of the PMOS transistor is connected to the output terminal of the Schmitt trigger, a source of the PMOS transistor is connected to the N-th clock signal output terminal, and a drain of the PMOS transistor is connected to the first input terminal of the delay circuit.

14. The display device according to claim 13, wherein the delay circuit comprises a first D flip-flop, a second D flip-flop, a third D flip-flop, a fourth D flip-flop, a fifth D flip-flop, a first AND gate, a second AND gate, a third AND gate, and a fourth AND gate;

an input terminal of the first D flip-flop is connected to the drain of the PMOS transistor, an output terminal of the first D flip-flop is connected to an input terminal of the second D flip-flop, an output terminal of the second D flip-flop is connected to an input terminal of the third D flip-flop, an output terminal of the third D flip-flop is connected to an input terminal of the fourth D flip-flop, and an output terminal of the fourth D flip-flop is connected to an input terminal of the fifth D flip-flop;

a clock terminal of the first D flip-flop, a clock terminal of the second D flip-flop, a clock terminal of the third D flip-flop, a clock terminal of the fourth D flip-flop, and a clock terminal of the fifth D flip-flop are respectively configured to receive the interval clock signal; and a first input terminal of the first AND gate is connected to the output terminal of the first D flip-flop, a second input terminal of the first AND gate is connected to the output terminal of the second D flip-flop, and an output terminal of the first AND gate is connected to a first input terminal of the third AND gate; a first input terminal of the second AND gate is connected to the output terminal of the third D flip-flop, a second input terminal of the second AND gate is connected to the output terminal of the fourth D flip-flop, and an output terminal of the second AND gate is connected to a second input terminal of the third AND gate; a first input terminal of the fourth AND gate is connected to an output terminal of the third AND gate, a second input terminal of the fourth AND gate is connected to an output terminal of the fifth D flip-flop, and an output terminal of the fourth AND gate is connected to the (N+1)-th stage GOA drive circuit.

15. The display device according to claim 11, further comprising a clock signal generator; wherein the clock signal generator comprises an interval clock output terminal and a plurality of clock signal output terminals; and the interval clock output terminal is configured to output the preset interval clock signal.

* * * * *